Dec. 5, 1950

C. G. DE BLASIO 2,532,761

MAGNETIC RECORDER ADAPTER FOR
MOTION-PICTURE PROJECTORS

Filed Feb. 10, 1947

INVENTOR.
Conrad G. De Blasio
BY
S. Stephen Baker
HIS ATTORNEY.

Dec. 5, 1950 C. G. DE BLASIO 2,532,761
MAGNETIC RECORDER ADAPTER FOR
MOTION-PICTURE PROJECTORS
Filed Feb. 10, 1947 2 Sheets-Sheet 2
FIG_3_
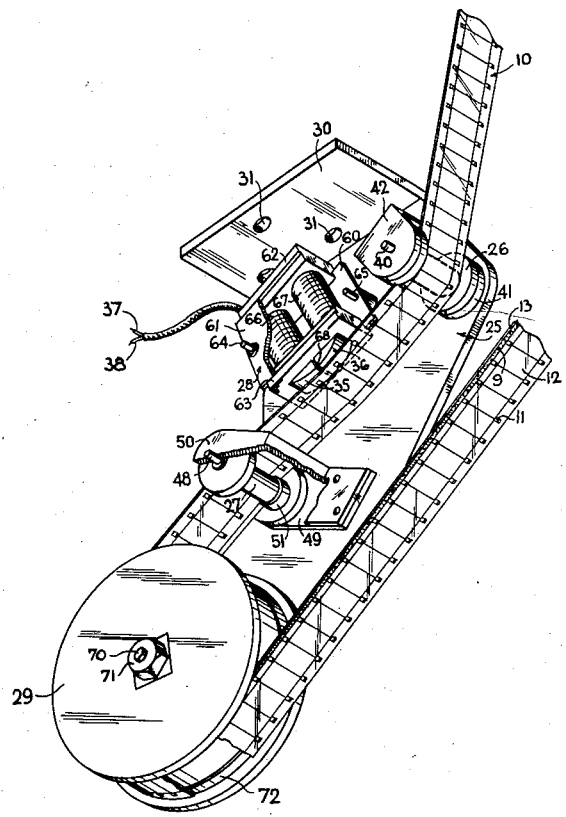
INVENTOR.
Conrad G. DeBlasio
BY
S. Stephen Baker
HIS ATTORNEY.

Patented Dec. 5, 1950

2,532,761

UNITED STATES PATENT OFFICE 2,532,761

MAGNETIC RECORDER ADAPTER FOR MOTION-PICTURE PROJECTORS

Conrad G. De Blasio, Red Bank, N. J.

Application February 10, 1947, Serial No. 727,516

3 Claims. (Cl. 179—100.2)

This invention relates to sound reproducing equipment for motion picture film and more particularly to a film projector incorporating reproduction of sound recorded thereon as well as projection of the photographic subject matter of the film.

One of the objects of this invention is to provide an adaptor for a normally silent type of projector which can be connected with facility and which provides efficient sound translations from a magnetized wire or area of the film without interfering unduly with the normal operation of the projector. Allied with this object is the provision of means to insure faithful translation of the recorded sound by maintaining maximum co-action between a magnetic pick-up in the adaptor and the sound area of the film while nevertheless protecting the protographic area of the film from damage during such coaction.

Another object of this invention is to provide the combination of both visual projection and sound reproduction means in a projector wherein the sound reproducing elements are of minimum expense and complexity, and wherein such elements serve to control the course of the traveling film only insofar as is necessary to procure reproduction of the sound recorded thereon, while effectively restoring it to its normal course after such reproduction has been completed.

Other objects of my invention will be apparent from the following description, it being understood that the above general statements of the objects of my invention are intended to describe and not limit it in any manner.

Referring to the drawings:

Fig. 3 is an isolated view of the adaptor device and illustrating the coaction of the photographic film with the elements of the adaptor.

Figure 1:
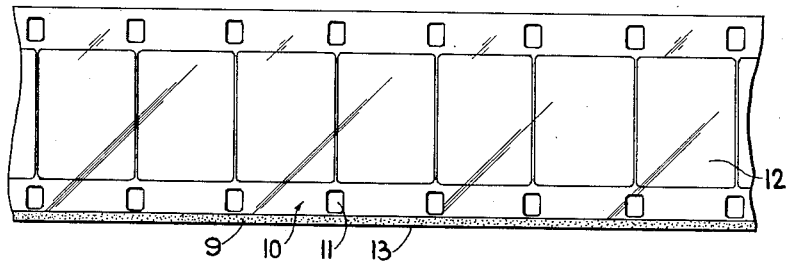
Fig. 1 is a plan view of a length of photographic film provided with a sound track of the type which may serve in the instant invention.

The film 10 is provided with a sound track 9 of comminuted magnetized material incorporated in a binder. The film is of elongated strip form, is provided with the usual sprocket holes 11 and is divided into frames 12 at its central area wherein is borne the photographed subject matter. Although the sound track 9 is disposed between the longituduinal edge 13 of the film and the line of sprocket holes 11, it will be understood that the adaptor of the instant invention is not limited to a sound track as thus disposed and connected but may serve any magnetic wire or area type of sound track which accompanies the photographed subject matter.

The film 10 is applied to a projector 14 in the ordinary manner except that it is diverted from its normal course to the take-up spool 15 so that reproduction of sound recorded thereon may be effected before it is wound upon the spool 15. Thus, the film is drawn off from the load spool 16 through the sprocket arrangement 17, shoe 18 and sprocket arrangement 19 in the usual manner. During passage along the shoe 18 it is projected visually through the lens device 20.

Figure 2:
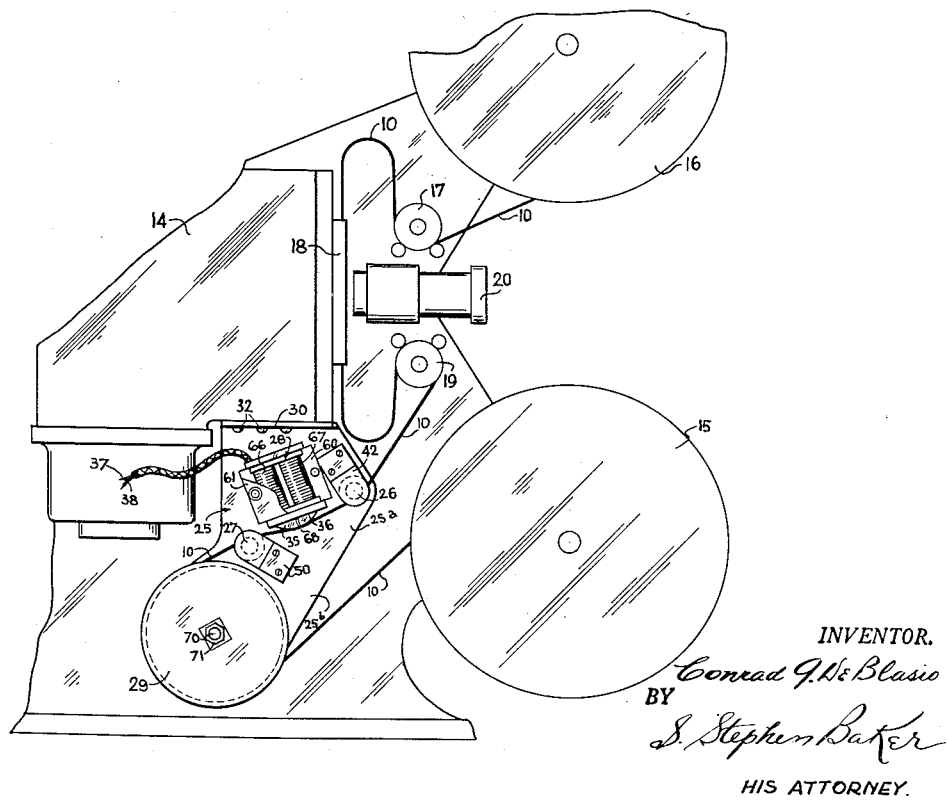
Fig. 2 is an elevational view of a sound film adaptor as applied to a conventional projector, the projector being shown in more or less schematic and fragmentary form.

The adaptor is secured in an appropriate position so that it may effectively receive the film as it leaves the sprocket 19. The adaptor comprises a support or wall 25 which may be of metal or the like. Wall 25 is substantially J-shaped in that it is formed with two angularly related arms. The upper arm 25a bears a pair of rollers 26 and 27 as well as magnetic pick-up 28 while the lower arm 25b extends away from the spool 15 and bears an idler pulley 29 at its outer end for restoring the film to its normal course without causing excessive strains thereon. Formed integrally with and adjacent to the upper arm of wall 25 is bracket member 30 which is perpendicularly related to wall 25. Bracket 30 is formed with openings 31 whereby the support or wall 25 may be conveniently bolted to any accessible wall of the projector 14. In the projector illustrated it may be simply and conveniently applied beneath the conventional condenser chamber as by the bolts 32, as illustrated in Fig. 2.

Referring to Fig. 3, the film 10 is shown as it emerges from the sprocket 19. It is then brought into effective coaction with the magnetic pick-up 28 so as to produce variations in the magnetic flow between pole pieces 35 and 36 so as to vary the current flow in the output wires 37 and 38. In accordance with the usual practice, wires 37 and 38 are applied to an amplifier and speaker, not shown, so as to render the magnetic variations audible.

Roller 26 is formed with a trunnion 40 at both ends thereof, the trunnions being journalled in the floor plate 41 and bracket 42 respectively. Bracket 42 is connected to floor plate 41 in the same manner as that of the journal supports of roller 27. Thus, roller 27 is similarly formed with trunnions 48 at both ends thereof, one of the trunnions being journalled in the floor plate 49 while the other trunnion is journalled in the bracket 50. Rollers 26 and 27 are substantially of the same form save that roller 27 is provided with a collar 51 at both sides thereof which are so designed to support the respective edge portions of the film. In this way, the central or photographic area of the film is maintained spaced above the roller 27 so as not to injure the emulsion side thereof. It is evident that roller 26 need not be so formed since it bears against the opposite or non-emulsion side of the film.

By thus disposing the rollers 26 and 27 and particularly in combination with the disposition of magnetic pick-up 28 the film is given an effective tension along an extremely short portion thereof to insure proper coaction with the pole pieces of the pick-up.

The magnetic pick-up comprises plates 60 and 61 which are assembled with plates 62 and 63 to form a housing for the magnet poles. The housing is secured to the upper arm of support 25 as by the bolts 64 and 65. The housing is supported in raised position, as illustrated in Fig. 3, so that the pole pieces 35 and 36 abut the extreme longitudinal edge of the film bearing the sound track, the width of the pole pieces being only slightly greater than the width of the sound track. It will be understood that the sound track is arranged to be on the side of the film facing the pick-up 28.

The poles are preferably laminated and have series connected coils 66 and 67 wound thereover, the output leads 37 and 38 being respectively connected to such coils. The pole pieces are brought out through an opening in plate 63 and arranged so as to define a gap 68 across which a varied magnetic flow is provided through the medium of the sound track. Such variation is, of course, translated by the coils into a current flow of the recorded audio frequencies. The gap 68 is as small as is practical in order to realize maximum fidelity of transcription, and it has been found that a gap of .001 centimeter or even less is satisfactory.

The periphery of the assembled pole pieces is preferably of a high radius of curvature in the area of gap 68 in order that the sound track contact an extremely limited portion of such periphery on both sides of the gap 68. The pole pieces, while arcuate at their surfaces, are substantially square in cross section, it having been found that such design provides satisfactory operation and lends itself to easy manufacture and assembly.

In order to continue the film along a substantially downward course as determined by the guiding rollers 26 and 27 and gradually changing its direction so that it is restored to the take-up spool 15 without unnecessary strains, the idler pulley 29 is provided. Idler pulley 29 is of substantially larger diameter than the guide rollers 26 and 27 inasmuch as the film takes a reverse turn through the medium of pulley 29 and the diameter thereof prevents abrupt bends in the film during such reversal. Pulley 29 is rotatably secured by shaft 70 to the lower arm 25b of support 25, the nut 71 maintaining the pulley in position. Pulley 29 may be fabricated of plastic, metal or a like substance and it is formed with an annular collar 72 at each side thereof in order to provide edge supports for the film 13 while substantially avoiding contact with the central portions thereof so as to avoid damage to its photographic area.

The provision of the adaptor equipped with the elements hereinabove described insures that the sound reproducing equipment may be disposed on the projector without requiring a large connection area and facilitating such connection to a wall of the projector. The small size of the adaptor is further of advantage in that problems of installation are considerably lessened. It should further be observed that whereas the course of the film has been illustrated as proceeding from the sprocket 19 to the adaptor and then to the take-up spool 15, it is entirely feasible to adopt alternative courses in which the adaptor is effectively disposed before the sprocket 19 or 17. For example, it is practical and in may cases desirable, to lead the film from the lens area directly to the adaptor whereupon it may leave the pulley 29 and return upwardly to the sprocket 19, continuing thereafter to the take-up spool 15. The required modification is obvious from the drawing herein and specific advantages accrue in that the drive or travel of the film is rendered more positive by virtue of the sprocket driving force. It is also to be noted that the idler pulley 29 may well serve as a fly-wheel in the interest of smoothness of operation and it may accordingly be fabricated of a heavy material such as lead or the like.

Whiel there has been described what at present is considered a preferred embodiment of the invention, it will be evident that many changes and modifications may be made therein without departing from its spirit. It is therefore aimed in the appended claims to cover all such changes and modifications which fall within the true spirit and scope of the invention.

I claim:

1. A sound film adaptor for a motion picture projector having load and take-up reels for guiding the normal course of running film, said adaptor comprising a support for connection to said projector, a magnetic pick-up formed with an air gap mounted on said support and adapted to translate magnetic variations upon film running through the projector, and guide roller means effectively interposed between the load reel and take-up reel of the projector and operative to divert said film from a normal course between said reels to a position of coaction with said magnetic pick-up whereby said film may be restored to said normal course after such coaction has been effected, said guide roller means comprising a pair of rollers each disposed on respective sides of said magnetic pick-up and immediately adjacent thereto and so as to act against opposite sides of the running film whereby the film may be tensioned against said air gap, said rollers and magnetic pick-up all being tensioned against successive portions of the film which are substantially continuous.

2. A sound film adaptor for a motion picture projector having load and take-up reels and a lens therebetween, said adaptor comprising a support connectable to said projector below the lens thereof, a magnetic pick-up on said support and operative to translate said magnetic variations into electrical signals for audio reproduction, a pair of guide rollers on said support and respectively disposed on opposite sides of and immediately adjacent to said magnetic pick-up for guiding the film across the magnetic pick-up and effecting a tension of said film thereagainst, and an idler roller to restore the film to said take-up reel after said translations have been effected, said support being J-shaped with the lower arm thereof extending away from the lens and the take-up reel, said idler roller being disposed at the outer end of said lower arm, said magnetic pick-up being disposed on the upper arm of the J-shaped support.

3. A sound film adaptor according to claim 18 and including a perpendicular flange on the upper arm of said J-shaped support for connection of the adaptor to the projector, said magnetic pick-up being inclined relative to said upper arm.

CONRAD G. DE BLASIO.

REFERENCES CITED

The following references are of record in the file of this patent:

UNITED STATES PATENTS

| Number | Name | Date |
|---|---|---|
| 1,466,750 | Peterson | Sept. 4, 1923 |
| 1,877,731 | Kuchenmeister | Sept. 13, 1932 |
| 1,949,409 | Cohen | Mar. 6, 1934 |
| 1,977,569 | Hineline | Oct. 16, 1934 |
| 2,042,027 | Simons | May 26, 1936 |
| 2,058,193 | Victor | Oct. 20, 1936 |
| 2,064,049 | Wurm et al. | Dec. 15, 1936 |
| 2,099,376 | Shapiro | Nov. 16, 1937 |
| 2,412,318 | Camras | Dec. 10, 1946 |

FOREIGN PATENTS

| Number | Country | Date |
|---|---|---|
| 880,599 | France | Mar. 30, 1943 |

OTHER REFERENCES

TM 11–2548, released Oct. 18, 1946, pp. 4 and 5, required 179–100.2.